United States Patent
Chapus et al.

(10) Patent No.: US 8,110,091 B2
(45) Date of Patent: Feb. 7, 2012

(54) PROCESS FOR THE CONVERSION OF FEEDSTOCKS RESULTING FROM RENEWABLE SOURCES FOR PRODUCING GAS OIL FUEL BASES WITH A LOW SULPHUR CONTENT AND WITH AN IMPROVED CETANE NUMBER

(75) Inventors: Thierry Chapus, Lyons (FR); Karin Marchand, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 314 days.

(21) Appl. No.: 11/963,231

(22) Filed: Dec. 21, 2007

(65) Prior Publication Data

US 2008/0156694 A1 Jul. 3, 2008

(30) Foreign Application Priority Data

Dec. 21, 2006 (FR) ..................................... 06 11400

(51) Int. Cl.
*C10G 65/12* (2006.01)
(52) U.S. Cl. ............... 208/97; 208/58; 208/59; 208/211
(58) Field of Classification Search .................. 208/211, 208/97, 58, 59
See application file for complete search history.

(56) References Cited

U.S. PATENT DOCUMENTS

| | | | |
|---|---|---|---|
| 2003/0057134 A1 | 3/2003 | Benazzi et al. | |
| 2003/0089637 A1* | 5/2003 | Gueret et al. | 208/97 |
| 2004/0138059 A1 | 7/2004 | Euzen et al. | |
| 2006/0186020 A1* | 8/2006 | Gomes | 208/46 |
| 2006/0289338 A1* | 12/2006 | Gueret et al. | 208/67 |

FOREIGN PATENT DOCUMENTS

| | | |
|---|---|---|
| EP | 1 681 337 A1 | 7/2006 |
| EP | 1 693 432 A1 | 8/2006 |
| EP | 1 741 768 A1 | 1/2007 |
| FR | 2 826 971 A1 | 1/2003 |
| FR | 2 846 574 A1 | 5/2004 |
| WO | WO 2006/131621 | * 12/2006 |

* cited by examiner

*Primary Examiner* — Walter D Griffin
*Assistant Examiner* — Renee E Robinson
(74) *Attorney, Agent, or Firm* — Millen, White, Zelano & Branigan, P.C.

(57) ABSTRACT

The invention relates to a process for the treatment of heavy petroleum feedstocks in order to produce a gas oil fraction having a sulphur content of less than 50 ppm and generally 10 ppm which comprises the following stages:
e) mild hydrocracking in a catalyst fixed bed,
f) separation of the hydrogen sulphide, of a distillate cut including a gas oil fraction and of a fraction which is heavier than the gas oil,
g) hydrotreating, by contact with at least one catalyst, of at least a portion of the distillate cut obtained in stage b) including the gas oil fraction, as a mixture with a feedstock resulting from a crude or refined renewable source,
h) separation of a gas oil cut comprising less than 50 ppm of sulphur.
Advantageously, the heavy fraction is sent for catalytic cracking. Preferably, the process is carried out with makeup hydrogen introduced in stage c) and very advantageously all the makeup hydrogen for the process is introduced in stage c). The invention also relates to a plant which can be used for implementing this process.

28 Claims, 1 Drawing Sheet

Figure 1:
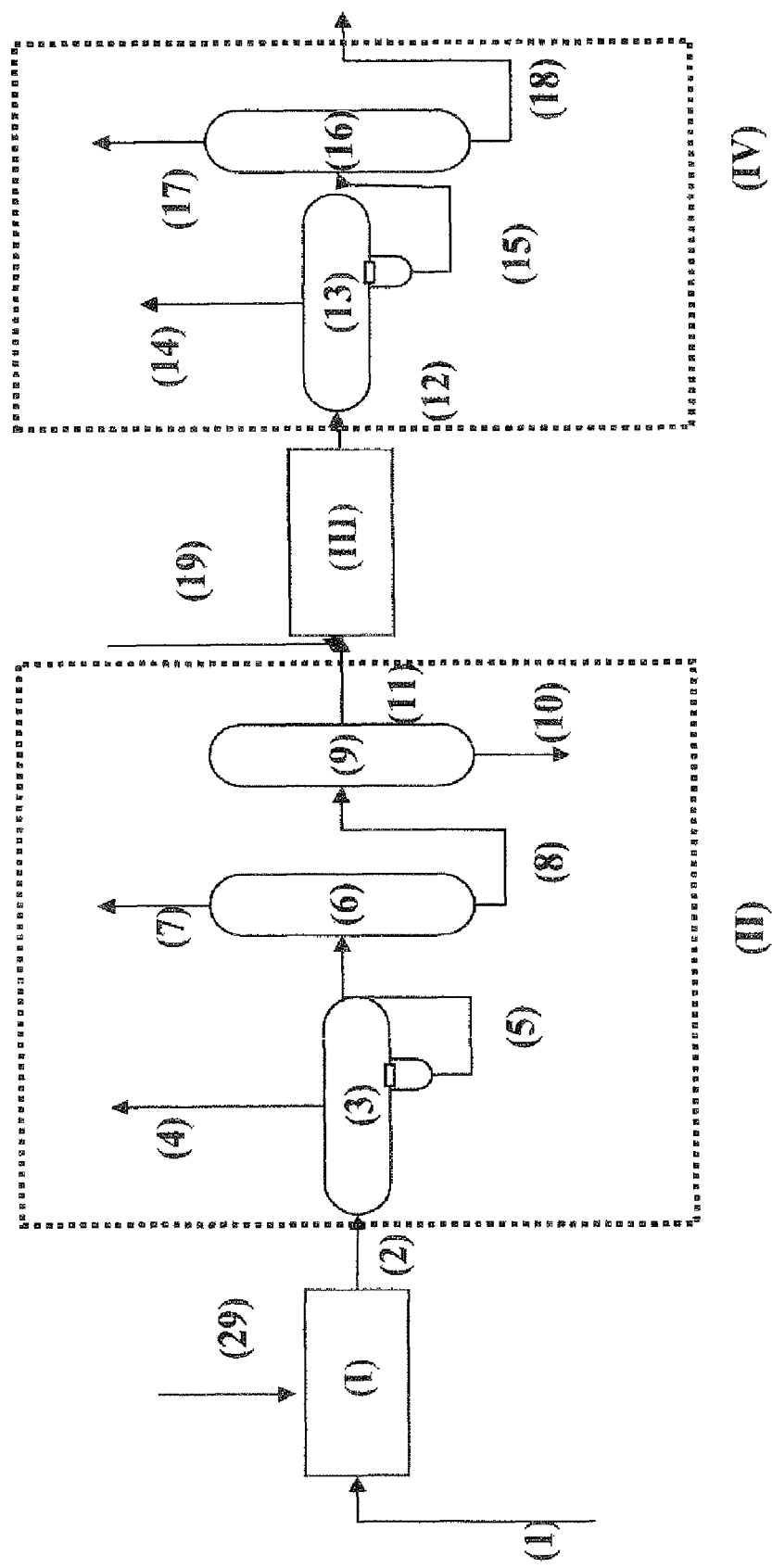

PROCESS FOR THE CONVERSION OF FEEDSTOCKS RESULTING FROM RENEWABLE SOURCES FOR PRODUCING GAS OIL FUEL BASES WITH A LOW SULPHUR CONTENT AND WITH AN IMPROVED CETANE NUMBER

CROSS REFERENCE TO RELATED APPLICATION

This application is related to concurrently filed application "Method of Converting Feedstocks Coming from Renewable Sources into High-Quality Gas-Oil Fuel Bases" by CHAPUS, Ser. No. 11/963,223, filed Dec. 21, 2007, claiming priority of French application 06/11,398 filed Dec. 21, 2006.

The present invention relates to a process and plant for the treatment of feedstocks originating from renewable sources, integrated with existing refining processes. It relates to a process which makes it possible to convert, at least in part, a hydrocarbon feedstock, for example a vacuum distillate obtained by straight-run distillation of a crude oil, and also a feedstock resulting from a renewable source, so as to produce, on the one hand, a gas oil base of good quality, that is to say corresponding to the 2005 specifications for sulphur (less than 50 ppm) and with an improved cetane number, and, on the other hand, a heavier product which can advantageously be used as feedstock for catalytic cracking (such as fluid bed catalytic cracking).

PRIOR STATE OF THE ART

Patent Application EP 1,693,432 A1 (Petrobras) describes a process which makes possible the hydroconversion of a mixture of vegetable oils (from 1% to 75% by volume) and of hydrocarbons (from 99% to 25% by volume) in a single hydrotreating reactor, under a pressure of 4 MPa to 10 MPa, with a catalytic bed of NiMo or CoMo type operated at a temperature of between 320° C. and 400° C. The advantage of this approach is the gain in terms of cetane number and of reduction in density contributed by the mixture with the vegetable oil, in comparison with the properties obtained by direct treatment of the petroleum base. In addition, the mixing of the hydrocarbon feedstocks with vegetable oils makes it possible to improve the low-temperature properties of the effluents obtained in comparison with those which would be obtained by treatment of the vegetable oils alone.

In many countries, the current specifications for sulphur content in gas oils are currently 50 ppm of sulphur, with a tendency to limit this content to 10 ppm of sulphur maximum.

The Applicant Company has thus looked for a process which makes it possible to achieve this aim.

SUMMARY OF THE INVENTION

More specifically, the invention relates to a process for the treatment:
- of a petroleum feedstock, at least 80% by weight of which boils above 340° C. and which comprises at least 0.05% by weight of sulphur, and;
- of a feedstock resulting from a renewable source, comprising vegetable oils which are crude or refined and/or animal fats. These feedstocks typically comprise triglyceride structures and/or fatty acids, the chemical structure of the latter corresponding to that of the hydrocarbons present in gas oils.

The process for the treatment according to the invention of petroleum feedstocks, at least 80% by weight of which boils at above 340° C. and which comprise at least 0.05% by weight of sulphur, to produce at least one gas oil cut with a sulphur content of at most 50 ppm by weight and preferably of at most 10 ppm by weight, comprises the following stages:

a) mild hydrocracking in a fixed bed of at least one catalyst at a temperature of between 300 and 500° C., a pressure of between 2 MPa and 10 MPa and an hourly space velocity of between 0.1 $h^{-1}$ and 10 $h^{-1}$ and in the presence of 100 to 5000 $Nm^3$ of hydrogen/$m^3$ of feedstock, the net conversion to products boiling below 360° C. being between 10 and 50% by weight, b) separation, from the effluent resulting from stage a), of a gas comprising hydrogen, of the hydrogen sulphide formed in stage a), of at least one distillate cut including a gas oil fraction and of a fraction which is heavier than gas oil, c) hydrotreating, by contact with at least one catalyst, of at least a portion of the said distillate cut obtained in stage b) including the gas oil fraction, as a mixture with a feedstock resulting from a crude or refined renewable source, at a temperature of between 180 and 320° C., a pressure of between 2 and 10 MPa and an hourly space velocity of between 0.1 and 10 $h^{-1}$ and in the presence of 200 to 5000 $Nm^3$ of hydrogen/$m^3$ of feedstock, d) separation of the hydrogen, of the gases and of at least one gas oil cut.

One of the advantages of the invention lies in the fact that the mild hydrocracking stage a) makes it possible to operate, in the hydrotreating stage c), under less severe operating conditions.

ADVANTAGE OF THE INVENTION

We have discovered that it is advantageous to treat, in the said hydrotreating stage c) of the process according to the invention, as a mixture with the gas oil cut of fossil origin resulting from the mild hydrocracking stage a), feedstocks resulting from renewable sources which are as follows: vegetable oils and/or animal fats which are crude or which have been subjected beforehand to a more or less thorough refining treatment, and also mixtures of feedstocks of such origins. These feedstocks are generally composed of chemical structures of the types of triglycerides and/or fatty acids, the chemical structure of the latter positioning them in the range of boiling points of hydrocarbon cuts present in gas oils. Generally, the contents of sulphur, nitrogen and aromatics are low in these types of feedstocks, in any case lower than in the feedstocks of fossil origin.

Such chemical structures are capable, under the operating conditions of this hydrotreating stage c) of the process according to the invention and with the catalysts used, of being completely converted to hydrocarbons of paraffin type. The treatment of feedstocks of this type as a mixture with the gas oil resulting from the hydrocracking exhibits the following advantages:
- decrease by dilution effect in the contents of sulphur, nitrogen and aromatics of the feedstock taken as a whole to be treated in the hydrotreating stage c) of the process according to the invention. This makes it possible to significantly relax the operating conditions required in this treatment and to reduce the hydrogen consumption of this stage.
- the hydrogenation of these feedstocks of vegetable and/or animal origin is generally exothermic. The treatment as a mixture with a conventional gas oil cut thus makes it possible to "buffer" this exothermicity and to thus protect the catalyst, for which the formation of hot spots would be liable to promote the formation of coke and thus to damage the stability of the performance and to reduce the cycle time.

to improve the quality of the gas oil cut taken as a whole produced and in particular the cetane number, due to the formation of hydrocarbons of linear paraffin type, that is to say hydrocarbons characterized by an excellent cetane number, by hydrogenation of the triglyceride and/or fatty acid structures.

DETAILED DESCRIPTION OF THE INVENTION

The feedstocks treated during stage a) are heavy feedstocks, that is to say that 80% by weight boils above 340° C. Their initial boiling point generally becomes established at least 340° C., often at least 370° C., indeed even at least 400° C. Very advantageously, the process makes it possible to treat feedstocks having a final boiling point of at least 450° C. and which can even range beyond 650° C.

Their sulphur content is at least 0.05% by weight, often at least 1% by weight and very often at least 2%, indeed even at least 2.5%, by weight. Feedstocks comprising 3% or more of sulphur are highly suitable in this process.

The feedstocks which can be treated in stage a) of the present invention are chosen from the group formed by straight-run vacuum distillates, vacuum distillates resulting from a conversion process, such as, for example, those originating from coking, from a fixed bed hydroconversion (such as those resulting from the Hyvahl® processes for the treatment of heavy feedstocks developed by the Applicant Company) or from processes for hydrotreating heavy feedstocks in an ebullating bed (such as those resulting from the H-Oil® processes), or solvent-deasphalted oils (the solvent being, for example, propane, butane or pentane) resulting from the deasphalting of a straight-run vacuum residue, or residues resulting from processes for the conversion of heavy feedstocks, such as, for example, Hyvahl® and H-Oil® processes. The feedstocks can also be formed by mixing these various fractions. They can also comprise gas oil and heavy gas oil cuts originating from catalytic cracking generally having a distillation range from approximately 150° C. to approximately 370° C. They can also comprise aromatic extracts and paraffins obtained in the context of the manufacture of lubricating oils. According to the present invention, the feedstocks which are treated are preferably vacuum distillates.

Stage a)—The Feedstock as Described Above is Treated in Stage a) by Mild Hydrocracking.

The mild hydrocracking of stage a) is carried out with at least one fixed bed of at least one catalyst and a hydrocracked effluent is produced.

The operation is usually carried out under an absolute pressure of 2 to 10 MPa, preferably of 2.5 to 9 MPa and more preferably still of 2.5 to 7 MPa, at a temperature of between 300° C. and 500° C. and preferably of between 350 and 450° C. The hourly space velocity (HSV) and the hydrogen partial pressure are chosen according to the characteristics of the product to be treated and the desired conversion. Generally, the HSV lies within a range of between 0.1 $h^{-1}$ and 10 $h^{-1}$ and preferably of between 0.2 $h^{-1}$ and 5 $h^{-1}$. The total amount of hydrogen mixed with the feedstock and thus entering the region in which stage a) is carried out is usually between 100 and 5000 normal cubic metres ($Nm^3$) per cubic metre ($m^3$) of liquid feedstock, advantageously between 100 and 2000 $Nm^3/m^3$; generally, it is at least 200 $Nm^3/m^3$ and preferably between 200 and 1500 $Nm^3/m^3$.

The net conversion to products boiling below 360° C. is generally from 10 to 50% by weight, and from 15 to 45% by weight under the preferred operating conditions.

The $H_2S$ partial pressure at the outlet of stage a) is generally between 0.1 and 0.4 MPa; preferably, it is maintained between 0.15 and 0.3 MPa and very preferably between 0.15 and 0.25 MPa in order to improve the hydrodesulphurization.

The mild hydrocracking catalyst used in stage a) of the process according to the invention can advantageously be a conventional hydroconversion catalyst comprising, on an amorphous support, at least one metal or metal compound having a hydrodehydrogenating function.

The said catalyst can advantageously be a catalyst comprising metals from Group VIII, such as, for example, nickel and/or cobalt, generally in combination with at least one metal from Group VIB, for example molybdenum and/or tungsten. It is possible, for example, to employ a catalyst comprising from 0.5 to 10% by weight of nickel oxide (NiO) and preferably from 1 to 5% by weight of nickel oxide and from 1 to 30% by weight of molybdenum oxide ($MoO_3$), preferably from 5 to 25% by weight of molybdenum oxide, on an amorphous inorganic support, the percentages being expressed as % by weight with respect to the total weight of the catalyst.

The metals of the catalysts used in the hydrocracking stage a) of the process according to the invention are advantageously sulphur-comprising metals.

The total content of oxides of metals from Groups VI and VIII in the catalyst is advantageously between 5 and 40% by weight and preferably between 7 and 30% by weight, with respect to the total weight of the catalyst.

The ratio by weight, expressed as metal oxide, of metal (or metals) from Group VI to metal (or metals) from Group VIII is advantageously between 20 and 1 and preferably between 10 and 2.

The support can, for example, be chosen from the group formed by alumina, silica, silica/aluminas, magnesia, clays and mixtures of at least two of these minerals. This support can also include other compounds, such as, for example, oxides chosen from the group formed by boron oxide, zirconia, titanium oxide or phosphorus pentoxide. Use is preferably made of an alumina support and more preferably of η-, δ- or γ-alumina.

The said mild hydrocracking catalyst used in stage a) of the process according to the invention can also advantageously comprise an element such as phosphorus and/or boron and/or fluorine. This element can be introduced into the matrix or, preferably, can be deposited on the support. It is also possible to deposit silicon on the support, alone or with phosphorus and/or boron and/or fluorine. Phosphorus and/or boron are preferred.

The content by weight of oxide of the said element is usually advantageously less than 20% and preferably less than 10% and is usually advantageously at least 0.001%.

Preferred mild hydrocracking catalyst used in stage a) of the process according to the invention comprise at least one metal from Group VIII, preferably chosen from nickel and cobalt, at least one metal from Group VIB, preferably chosen from molybdenum and tungsten, silicon deposited on an alumina support and optionally phosphorus and/or boron, also deposited on the said alumina support.

Another preferred mild hydrocracking catalyst used in stage a) of the process according to the invention comprises at least one metal from Group VIII and at least one metal from Group VIB and a silica/alumina.

Another type of preferred mild hydrocracking catalyst used in stage a) of the process according to the invention is a catalyst comprising at least one matrix, at least one zeolite Y and at least one hydrodehydrogenating metal. The matrices, metals and additional elements described above can also participate in the composition of this catalyst.

Advantageous zeolites Y are described in Patent Applications WO-00/71641 and EP-911 077 and U.S. Pat. No. 4,738,940 and U.S. Pat. No. 4,738,941.

Stage b)—Separation of the Hydrocracked Effluent Resulting from Stage a)

In stage b), the said hydrocracked effluent is subjected, at least partly and preferably completely, to one or more separations.

The aim of this stage is to separate the gases from the liquid and in particular to recover the hydrogen and most of the hydrogen sulphide $H_2S$ formed in stage a) and to obtain a liquid effluent devoid of dissolved $H_2S$.

The said stage b) thus makes possible, starting from the effluent resulting from stage a), the separation of the hydrogen sulphide $H_2S$, of a gas comprising hydrogen, of a distillate cut including a gas oil fraction and of a liquid fraction which is heavier than gas oil.

During the separation of the hydrogen sulphide $H_2S$ from the liquid, a naphtha portion may be separated. This portion is then stabilized by removing the hydrogen sulphide $H_2S$.

The liquid effluent, devoid of $H_2S$ and optionally with the addition of the stabilized naphtha, is distilled in order to obtain at least one distillate cut including a gas oil fraction and at least one liquid fraction which is heavier than gas oil.

The distillate cut is a gas oil cut or a gas oil cut mixed with naphtha. It supplies stage c).

The liquid fraction which is heavier than the gas oil fraction can optionally be sent to a catalytic cracking process in which it is advantageously treated under conditions which make it possible to produce a gas fraction, a petrol fraction, a gas oil fraction and a fraction which is heavier than the gas oil fraction, often referred to by a person skilled in the art as slurry fraction.

This liquid fraction which is heavier than the gas oil fraction can also be used as low sulphur content industrial fuel or as thermal cracking feedstock.

When the naphtha is not sent for mixing with the gas oil in stage c), it is distilled. The naphtha fraction obtained can advantageously be separated into heavy naphtha, which will preferably be a feedstock for a reforming process, and into light petrol, which will preferably be subjected to a process for the isomerization of the paraffins.

At the outlet of stage b), the gas oil cut generally exhibits a sulphur content of between 100 and 500 ppm by weight. The gas oil cut thus does not meet the specifications required for sulphur. The other characteristics of the gas oil are also at a low level; for example, the cetane number is of the order of 45 and the content of aromatics is greater than 20% by weight.

The conditions in the distillation are generally chosen so that the initial boiling point of the heavy fraction is from approximately 340° C. to approximately 400° C. and preferably from approximately 350° C. to approximately 380° C., for example approximately 360° C.

For the naphtha, the final boiling point is between approximately 120° C. and 180° C.

The cut points are given by way of indication but the operator will choose the cut point according to the quality and amount of the desired products, as is the usual practice.

Stage c): Hydrotreating at Least a Portion of the Distillate Cut Including a Gas Oil Fraction Resulting from Stage b) as a Mixture with a Feedstock Resulting from a Renewable Source.

In the said stage c) of the process according to the invention, at least a portion and preferably all of the distillate cut including a gas oil fraction is subjected to hydrotreating in order to reduce the sulphur content below 50 ppm by weight and preferably below 10 ppm by weight. The said cut can include all or part of the naphtha.

According to the invention, a cut produced externally to the process according to the invention and which cannot normally be incorporated directly in the gas oil pool is added to the said distillate cut including the gas oil fraction. The said cut produced externally to the process according to the invention is a feedstock resulting from a renewable source.

It is thus a matter of cotreating, in stage c) of the process according to the invention, a mixture formed of a feedstock resulting from a renewable source (from 1 to 99% by volume) and of a distillate cut including a gas oil fraction (from 99% to 1% by volume). Preferably, the proportions of the mixture formed of the feedstock resulting from a renewable source and of the distillate cut including a gas oil fraction are 1 to 75% by volume of feedstock resulting from a renewable source per 99% to 25% by volume of the distillate cut including a gas oil fraction.

The term "feedstock resulting from a renewable source" is understood to mean feedstocks comprising oils and/or fats of vegetable and/or animal and/or fish origin and products derived from these sources, the said oils and/or fats being crude or having been subjected beforehand to a more or less thorough refining treatment, and also mixtures of feedstocks of such origins. The said feedstocks are generally composed of chemical structures of the type of triglycerides and/or fatty acids, the chemical structure of the latter positioning them in the range of boiling points of hydrocarbon cuts present in gas oils. Generally, the contents of sulphur, nitrogen and aromatics are low in feedstocks of this type, and in any case lower than in feedstocks of fossil origin.

Advantageously, it is also possible to add, to the said distillate cut including the gas oil fraction, a hydrocarbon fraction chosen from the group formed by the LCOs (Light Cycle Oil originating from fluidized bed catalytic cracking).

The hydrotreating of stage c) of the process according to the invention usually advantageously operates under an absolute pressure of between 2 and 10 MPa, preferably of between 2.5 and 9 MPa and more preferably still of between 2.5 and 7 MPa. The temperature in this stage is usually between 180 and 320° C., preferably between 200° C. and 315° C. and more preferably still between 200° C. and 310° C. This temperature is usually adjusted according to the desired level of hydrodesulphurization and/or of saturation of the aromatics and has to be compatible with the desired cycle time. The hourly space velocity (HSV) and the hydrogen partial pressure are chosen according to the characteristics of the product to be treated and the desired conversion. Generally, the HSV lies within a range of between $0.1\ h^{-1}$ and $10\ h^{-1}$ and preferably of between $0.1\ h^{-1}$ and $5\ h^{-1}$ and more preferably still of between $0.2\ h^{-1}$ and $2\ h^{-1}$.

The total amount of hydrogen mixed with the feedstock is usually advantageously between 200 and 5000 normal cubic meters ($Nm^3$) per cubic metre ($m^3$) of liquid feedstock and preferably between 250 and 2000 $Nm^3/m^3$ and more preferably still between 300 and 1500 $Nm^3/m^3$.

The operation is likewise advantageously carried out with a reduced hydrogen sulphide partial pressure compatible with the stability of the sulphur-comprising catalysts. According to a preferred embodiment of the process according to the present invention, the hydrogen sulphide partial pressure is preferably less than 0.05 MPa, more preferably less than 0.03 MPa and more preferably still less than 0.01 MPa.

Generally, the hydrotreating catalyst used in stage c) of the process according to the invention should have a strong hydrogenating power, so as to carry out deep refining of the products and to obtain a significant lowering in the sulphur. According to a preferred embodiment of the process according to the present invention, the hydrotreating region operates at relatively low temperature, which favours deep hydrogenation, thus an improvement in the content of the aromatics of the product and in its cetane number, and a limitation on the coking. It would not be departing from the scope of the present invention to use, in the hydrotreating region, simultaneously or successively, a single catalyst or several different catalysts. Usually, this stage is carried out industrially in one or more reactors with one or more catalytic beds and with a downward liquid stream.

Use is advantageously made, in the hydrotreating stage c) of the process according to the invention, of at least one fixed bed of hydrotreating catalyst comprising a hydro-dehydrogenating role and an amorphous support. Use is preferably made of a catalyst for which the support is chosen, for example, from the group formed by alumina, silica, silica/aluminas, magnesia, clays and mixtures of at least two of these minerals. Use is preferably made of an alumina support and better still of an η-, δ- or γ-alumina support. This support can also include other compounds, for example oxides chosen from the group formed by boron oxide, zirconia, titanium oxide and phosphorus pentoxide.

The hydrogenating role of the catalyst of the hydrotreating stage c) of the process according to the invention is advantageously provided by at least one metal from Group VIII and/or Group VIB.

The said catalyst can advantageously comprise at least one metal from Group VIII chosen from cobalt and nickel, preferably in combination with at least one metal of Group VIB chosen from molybdenum and tungsten.

Very preferably, use will be made of a catalyst based on nickel and on molybdenum. For the gas oils which are difficult to hydrotreat, and since a significant reduction in the contents of aromatics is desired, in particular in order to improve the cetane number of the gas oil cut produced, the choice of a catalyst based on nickel and on molybdenum is generally more judicious than that of a catalyst based on cobalt and on molybdenum.

A preferred hydrotreating catalyst used in stage c) of the process according to the invention is advantageously a catalyst comprising an amorphous inorganic support, a content by weight of nickel oxide of between 0.5 and 10% by weight and preferably of between 1 and 5% by weight, with respect to the total weight of the catalyst, and a content by weight of molybdenum oxide of between 1 and 30% by weight and preferably of between 5 and 25% by weight, with respect to the total weight of the catalyst.

The metals of the catalysts used in the hydrotreating stage c) of the process according to the invention are advantageously sulphur-comprising metals.

The total content of oxides of metals from Groups VI and VIII in the said catalyst is advantageously between 5 and 40% by weight and preferably between 7 and 30% by weight, with respect to the total weight of the catalyst.

The ratio by weight, expressed as metal oxide, of metal (or metals) from Group VI to metal (or metals) from Group VIII is advantageously between 20 and 1 and preferably between 10 and 2.

The said hydrotreating catalyst used in stage c) of the process according to the invention can also advantageously comprise an element such as phosphorus and/or boron and/or fluorine. This element can be introduced into the matrix or can preferably be deposited on the support. It is also possible to deposit silicon on the support, alone or with phosphorus and/or boron and/or fluorine. Phosphorus and/or boron are preferred.

The content by weight of oxide of the said element is usually advantageously less than 20% and preferably less than 10% and it is usually advantageously at least 0.001%.

Preferred hydrotreating catalysts used in stage c) of the process according to the invention comprise at least one metal from Group VIII, preferably chosen from nickel and cobalt, at least one metal from Group VIB, preferably chosen from molybdenum and tungsten, silicon deposited on an alumina support and optionally phosphorus and/or boron, also deposited on the said alumina support.

In a preferred embodiment of the process according to the invention, makeup hydrogen is introduced into the hydrotreating stage c) so as to maximize the hydrogen partial pressure in this stage, which makes it possible to improve the quality of the gas oil cuts produced and to promote the treatment of the feedstocks resulting from the renewable sources while minimizing the capital costs necessary.

Preferably, the amount of makeup hydrogen introduced at this stage c) is greater than the hydrogen chemical consumption necessary in order to obtain the performance set under the operating conditions set for this stage c).

In a preferred embodiment of the process according to the invention, all the makeup hydrogen necessary for the process is introduced in stage c).

Thus, in the process according to the invention, the makeup hydrogen can thus be advantageously introduced in stage a) exclusively,
in stage c) exclusively,
in stages a) and c), so as to take into account the chemical consumption of hydrogen in stage a), so as to introduce the hydrogen necessary for the desired hydrogenation also in stage a).

Another consequence is that it is possible to optimize the hydrogen makeup in stage c) according to the refractory level of the mixture of gas oils and feedstock resulting from a renewable source to be treated.

This advantageous arrangement of the invention thus makes it possible to substantially improve the performance of the hydrotreating catalyst and in particular the hydrodesulphurization for given total temperature and pressure conditions which correspond to values which are practical industrially.

This is because it makes it possible to maximize the hydrogen partial pressure and thus the performance in stage c) of the process according to the invention while maintaining a virtually identical total pressure of stages a) and c) (and thus their capital costs).

Thus, in the case where feedstocks with a very high sulphur content, such as, for example, feedstocks having at least 1% by weight of sulphur, preferably at least 2% by weight of sulphur, are used in the mild hydrocracking stage a) of the process according to the invention, the said feedstocks producing refractory and sulphur-comprising conversion gas oils, it has become possible to obtain middle distillates possessing good qualities, in particular with a low sulphur content, under conditions in particular of relatively low pressure and thus to limit the capital costs necessary.

Stage d)—Final Separation of the Hydrotreated Effluent Resulting from Stage c)

The separation stage d) of the process according to the invention is carried out on at least a portion and preferably all of the hydrotreated effluent resulting from stage c), so as to separate the hydrogen, the gases, such as, for example, the hydrogen sulphide, the gases resulting from the cotreatment of the feedstocks resulting from renewable sources, such as, for example, carbon monoxide, carbon dioxide and steam, and at least one liquid gas oil cut with a sulphur content of less than 50 ppm by weight and preferably of less than 10 ppm by weight.

The hydrogen is separated from the effluent.

The hydrogen sulphide is also separated from the liquid effluent and thus a gas oil is obtained comprising at most 50 ppm by weight of sulphur and generally comprising less than 10 ppm by weight of sulphur.

Generally, a naphtha cut is also obtained.

Products Obtained

The gas oil obtained exhibits a suphur content of less than 50 ppm by weight, generally of less than 20 ppm by weight and most often of less than 10 ppm by weight.

Furthermore, the cetane number has been improved by 1 to 20 points, generally by 1 to 18 points, also by 1 to 15 points and more preferably by 1 to 12 points, with respect to the gas oil participating in the hydrotreating.

Its total amount of aromatics has also been reduced by at least 10%; the reduction can even range up to 90%.

The amount of polyaromatics in the final gas oil is at most 11% by weight.

Plant

The invention also relates to a plant for the treatment of petroleum feedstocks, at least 80% by weight of which boils above 340° C. and which comprises at least 0.05% of sulphur, comprising:

a) a mild hydrocracking region (I) comprising at least one fixed bed of hydrocracking catalyst and provided with a pipe (1) for the introduction of the feedstock to be treated, with a pipe (2) for the exit of the hydrocracked effluent and with a pipe (29) for the introduction of the hydrogen, b) a separation region (II) including at least one separator (3) (6) for separating the hydrogen-rich gas via the pipe (4), for separating, in the pipe (7), the hydrogen sulphide and obtaining, in the pipe (8), a liquid fraction, and also including a distillation column (9) for separating at least one distillate cut including a gas oil fraction in the pipe (11) and a heavy fraction in the pipe (10), c) a hydrotreating region (III) comprising at least one fixed bed of hydrotreating catalyst for treating the gas oil fraction obtained resulting from stage b). The operation according to the invention consists in treating this feedstock as a mixture with an external feedstock originating from a renewable source. This region is equipped with a pipe for the introduction of the hydrogen, with a pipe (19) for the introduction of the cut resulting from the renewable source; preferably, the said pipe (19) emerges in the pipe for introducing the gas oil cut (11); and with a pipe (12) for the exit of the hydrotreated effluent, d) a separation region (IV) including at least one separator (13) (16) for separating the hydrogen via the pipe (14) and for separating, in the pipe (17), the hydrogen sulphide and the gases optionally produced by hydrotreating the external feedstock resulting from a renewable source and, via the pipe (18), a gas oil having a sulphur content of less than 50 ppm.

The invention will be better understood from FIG. 1, which illustrates a preferred embodiment of the invention.

The feedstock to be treated (as defined above) enters via a pipe (1) into a mild hydrocracking region (I) which comprises at least one fixed bed of a hydrocracking catalyst. The hydrocracked effluent obtained in the pipe (2) is sent to the separation region (II).

The hydrocracked effluent first passes into a separator (3) which separates, on the one hand, a gas comprising hydrogen (gas phase) in the pipe (4) and, on the other hand, a liquid effluent in the pipe (5). It is possible to use a hot separator followed by a cold separator (preferred) or a cold separator exclusively.

The liquid effluent is sent to a separator (6), which is preferably a steam stripper, to separate the hydrogen sulphide from the hydrocarbon effluent. At the same time, at least a portion of the naphtha fraction can be separated with the hydrogen sulphide. The hydrogen sulphide, with the said naphtha, exits via the pipe (7), while the hydrocarbon effluent is obtained in the pipe (8).

The hydrocarbon effluent subsequently passes into a distillation column (9) and at least one distillate cut including a gas oil fraction is separated and reencountered in the pipe (11); a fraction which is heavier than gas oil is also separated and reencountered in the pipe (10).

Generally, the naphtha separated in the separator (6) is stabilized ($H_2S$ removed). In an advantageous arrangement, the stabilized naphtha is injected into the effluent entering the column (9).

The naphtha can be separated, in the column (9), in an additional pipe not represented in FIG. 1.

According to FIG. 1, the column (9) separates a gas oil fraction mixed with naphtha in the pipe (11). The fraction of the pipe (10) is advantageously conveyed to the catalytic cracking region (V) not represented in FIG. 1.

Furthermore, a feedstock of very good quality for catalytic cracking (low sulphur and nitrogen content, moderate enriching in hydrogen) is produced.

The naphtha obtained separately, optionally with the addition of the naphtha separated in the region (IV), is advantageously separated into heavy naphtha and light petrol, the heavy naphtha being sent to a reforming region and the light petrol to a region where isomerization of the paraffins is carried out.

The separation region (II) formed of separators (3) (6) and of the column (9) has been represented diagrammatically in dotted lines in FIG. 1.

The distillate cut including the gas oil fraction obtained at the exit of the separation region (II) is subsequently sent via the pipe (11), with the addition of an external cut resulting from a renewable source via a pipe (19) emerging in the pipe (11), into a hydrotreating region (III) equipped with at least one fixed bed of a hydrotreating catalyst.

The hydrotreated effluent obtained exits via the pipe (12) in order to be sent to the separation region (IV) represented diagrammatically in dotted lines in FIG. 1.

The separation region (IV) comprises here a separator (13), preferably a cold separator, where the separation is carried out of a gas phase, exiting via the pipe (14), and of a liquid phase, exiting via the pipe (15).

The liquid phase is sent to a separator (16), preferably a stripper, in order to remove the hydrogen sulphide, which exits in the pipe (17), generally as a mixture with the naphtha. A gas oil fraction is withdrawn via the pipe (18), which fraction is in accordance with the specifications with regard to sulphur, i.e. having less than 50 ppm by weight of sulphur and generally less than 10 ppm by weight. The $H_2S$/naphtha mixture is subsequently optionally treated in order to recover the purified naphtha fraction.

In the preferred implementation of FIG. 1, all the makeup hydrogen is introduced via a pipe (not shown) in the region (II). In this implementation, there is no pipe (29) introducing makeup hydrogen in the region (I).

In another implementation, it is possible to provide pipe (29) which introduces makeup hydrogen in the region (I).

An advantageous implementation comprises, for the makeup hydrogen, a pipe (not shown) in the region (I) and a pipe in the region (II).

Treatment and Recycling of the Hydrogen

The gas comprising hydrogen which was separated in stage b) is, if necessary, at least partly treated in order to reduce its $H_2S$ content (preferably by washing with at least one amine) before being recycled in stage a) and optionally in stage c).

The recycling gas preferably comprises an amount of $H_2S$ of greater than 0 mol % and up to 1 mol %. Advantageously, this amount is at least 15 ppm, preferably at least 0.1 mol %, indeed even at least 0.2 mol %.

The presence of $H_2S$ is of use in maintaining the catalyst in the sulphided state in stages a) and c), but an excess of $H_2S$ might reduce the hydrodesulphurization.

The hydrogen separated in stage d) is added to the optionally purified hydrogen resulting from stage b). The mixture is recompressed and then recycled to stage a) and optionally to stage c).

This is because, in the case where makeup hydrogen is introduced in stage c), the recycle to stage c) may not be necessary, in particular when all the makeup hydrogen is introduced in stage c).

It is advantageously possible to introduce the recycle hydrogen with the feedstock entering in stage a) and/or in the form of quench hydrogen between the beds of catalysts.

EXAMPLE

This example illustrates the invention without limiting it.

This example was obtained in a pilot unit which differs from an industrial unit in that the fluids are in upflow or ascending current mode in the pilot unit. It has been shown elsewhere that this method of operation in a pilot unit gives results which are equivalent to those of an industrial unit operating in trickle bed mode.

Example 1

Stage a):

The feedstock which is subjected to the mild hydrocracking is a vacuum distillate comprising 3% by weight of sulphur. The conversion of the distillation interval in the hydrocracking region is 35% of the 360° C.+ fraction. The hydrogen purity of the recycling gas is 78.8 mol %. The hydrogen partial pressure is then 5.6 MPa at the outlet of the hydrocracking section. The total pressure is 4 MPa, the temperature is 380° C., the HSV is 1 $h^{-1}$ and the amount of hydrogen/$m^3$ of feedstock is 320 $Nm^3$ of hydrogen/$m^3$ of feedstock.

The feedstock is brought into contact with a mild hydrocracking catalyst in a fixed bed. This catalyst comprises an alumina support, a nickel oxide content of 4.3% by weight, an $MoO_3$ content of 21% by weight and a $P_2O_5$ content of 5% by weight.

Stage b):

After separation, a gas oil cut is obtained comprising 250 ppm by weight of sulphur.

The process is carried out according to the scheme of FIG. 1, except that the $H_2$ makeup is dedicated to each hydrocracking and hydrotreating unit. The recycling of the hydrogen-rich gas is common to the two units with washing with amines of the gas separated in stage b).

Stage c):

The gas oil cut obtained in stage b) is mixed with a prerefined rapeseed vegetable oil. The mixture thus obtained is composed to 70% by weight of the partially desulphurized gas oil resulting from stage a) and to 30% by weight of the prerefined rapeseed vegetable oil. This mixture is hydrotreated by contact with the same hydrotreating catalyst used during stage a), namely a catalyst of the type formed of NiMoP on alumina, in sulphide form.

The operating conditions used to obtain a gas oil cut having less than 50 ppm of sulphur are:
Total pressure: 4 MPa
Space velocity (HSV)=1 $h^{-1}$
Reaction temperature=310° C.
Amount of hydrogen: 320 $Nm^3$ of hydrogen/$m^3$ of feedstock.

After separation of the effluent obtained at the outlet of the hydrotreating stage c) of the process according to the invention, the characteristics of the gas oil obtained are as follows:
Sulphur: 7 ppm by weight
Cetane number: 72
Density: 837 kg/$m^3$ Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 06/11.400, filed Dec. 21, 2006, which is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the treatment of petroleum feedstock, at least 80% by weight of which boils above 340° C. and which comprises at least 0.05% by weight of sulphur, to produce at least one gas oil cut with a sulphur content of at most 10 ppm by weight, said process comprising:
   a) subjecting said feedstock to mild hydrocracking in a fixed bed of at least one catalyst at a temperature of between 300 and 500° C., a pressure of between 2 MPa and 10 MPa, and an hourly space velocity of between 0.1 $h^{-1}$ and 10 $h^{-1}$, and in the presence of 100 to 5000 $Nm^3$ of hydrogen/$m^3$ of feedstock, to provide a net conversion to products boiling below 360° C. of between 10 and 50% by weight,
   b) separating effluent resulting from a) to obtain a gas comprising hydrogen, hydrogen sulphide formed in a), at least one distillate cut including a gas oil fraction, and a fraction which is heavier than gas oil,
   c) hydrotreating at least a portion of said at least one distillate cut including the gas oil fraction obtained in b) as a mixture with a feedstock resulting from a crude or refined renewable source, by contacting said mixture with at least one catalyst at a temperature of between 200° C. and 310° C., a pressure of between 2 and 10

MPa, and an hourly space velocity of between 0.1 and 10 $h^{-1}$, and in the presence of 200 to 5000 $Nm^3$ of hydrogen/$m^3$ of feedstock, d) separating effluent obtained from c) to obtain hydrogen, gases formed in c), and said at least one gas oil cut.

2. A process according to claim 1, wherein said feedstock used in a) comprises a feed selected from straight-run vacuum distillates, vacuum distillates resulting from a conversion process, deasphalted oils or residues resulting from processes for the conversion of heavy feedstocks, and mixtures thereof.

3. A process according to claim 2, wherein said feedstock used in a) further comprises gas oil and/or heavy gas oil cuts originating from catalytic cracking.

4. A process according to claim 2, wherein said effluent from a) has an $H_2S$ partial pressure of between 0.1 and 0.4 MPa.

5. A process according to claim 1, wherein said mild hydrocracking in a) is carried out at a temperature of between 350 and 450° C., under an absolute pressure of between 2.5 and 7 MPa, at an hourly space velocity of between 0.2 $h^{-1}$ and 5 $h^{-1}$ and in the presence of 200 to 1500 $Nm^3$ of hydrogen/$m^3$ of feedstock, to provide a net conversion to products boiling below 360° C. of between 15 and 45% by weight.

6. A process according to claim 1, wherein the catalyst used in the mild hydrocracking in a) comprises from 0.5 to 10% by weight of nickel oxide and from 1 to 30% by weight of molybdenum oxide on an amorphous inorganic support.

7. A process according to claim 6, wherein said support comprises alumina, silica, a silica/alumina, magnesia, a clay, or mixtures thereof.

8. A process according to claim 6, wherein said catalyst used in the mild hydrocracking in a) further comprises phosphorus and/or boron and/or fluorine.

9. A process according to claim 8, wherein the content by weight of oxide of phosphorus and/or of boron and/or of fluorine in said catalyst used in the mild hydrocracking in a) is less then 20% and is at least 0.001%.

10. A process according to claim 1, wherein said feedstock resulting from a renewable source used in the hydrotreating in c) comprises:

oils and/or fats of vegetable and/or animal and/or fish origin and products derived from said sources, said oils and/or fats being crude or having been subjected beforehand to a refining treatment, and also mixtures of feedstocks of such origins, said feedstock resulting from a renewable source comprising triglycerides and/or fatty acid structures, the chemical structure of the latter positioning the feedstock resulting from a renewable source in the range of boiling points of hydrocarbon cuts present in gas oils.

11. A process according to claim 1, wherein said hydrotreating in c) is carried out under a pressure of between 3 and 7 MPa, at an hourly space velocity of between 0.2 $h^{-1}$ and 2 $h^{-1}$, and in the presence of 300 to 1500 $Nm^3$ of hydrogen/$m^3$ of feedstock.

12. A process according to claim 11, in which said effluent from c) has an $H_2S$ partial pressure of less than 0.05 MPa.

13. A process according to claim 12, wherein said $H_2S$ partial pressure is less than 0.03 MPa.

14. A process according to claim 12, wherein said $H_2S$ partial pressure is less than 0.01 MPa.

15. A process according to claim 1, wherein the catalyst used in the hydrotreating in c) comprises from 0.5 to 10% by weight of nickel oxide and from 1 to 30% by weight of molybdenum oxide, on an inorganic support.

16. A process according to claim 15, wherein said support comprises alumina, silica, a silica/alumina, magnesia, or a clay, or mixtures thereof.

17. A process according to claim 15, wherein said catalyst used in the hydrotreating in c) further comprises phosphorus and/or boron and/or fluorine.

18. A process according to claim 17, wherein the content by weight of oxide of phosphorus and/or of boron and/or of fluorine in said catalyst used in the hydrotreating in c) is less than 20% and is at least 0.001%.

19. A process according to claim 1, wherein said mild hydrocracking in a) is carried out at a temperature of between 350 and 450° C., under an absolute pressure of between 2.5 and 9 MPa, at an hourly space velocity of between 0.2 $h^{-1}$ and 5 $h^{-1}$, and in the presence of 200 to 1500 $Nm^3$ of hydrogen/$m^3$ of feedstock.

20. A process according to claim 1, in which said effluent from a) has an $H_2S$ partial pressure of between 0.1 and 0.4 MPa.

21. A process according to claim 1, in which said effluent from a) has an $H_2S$ partial pressure of between 0.15 and 0.3 MPa.

22. A process according to claim 1, in which said effluent from a) has an $H_2S$ partial pressure of between 0.15 and 0.25 MPa.

23. A process according to claim 1, wherein in b) during separation of hydrogen sulphide from the liquid, a naphtha portion is separated and stabilized by removing hydrogen sulphide.

24. A process according to claim 23, wherein said at least one distillate cut including a gas oil fraction obtained in b) contains at least a portion of the stabilized naphtha.

25. A process according to claim 1, wherein the gas oil cut obtained in b) exhibits a sulphur content of between 100 and 500 ppm by weight.

26. A process according to claim 1, wherein said mixture that is hydrotreated in c) contains 1 to 75% by volume of a feedstock resulting from a renewable source and 99% to 25% by volume of said at least one distillate cut including a gas oil fraction.

27. A process according to claim 1, wherein said hydrotreating in c) is carried out under a pressure of between 2.5 and 7 MPa, at an hourly space velocity of between 0.2 $h^{-1}$ and 2 $h^{-1}$, and in the presence of 300 to 1500 $Nm^3$ of hydrogen/$m^3$ of feedstock.

28. A process according to claim 1, wherein in b) the effluent from a) is delivered to a first separator (3) from which hydrogen-rich gas is removed; the effluent from a) is then delivered to a second separator (6) from which hydrogen sulphide is removed; and then the effluent from a) is delivered to a distillation column (9) from which said at least one distillate cut including a gas oil fraction and said fraction which is heavier than gas oil are removed.

\* \* \* \* \*